US012593141B2

(12) United States Patent
Maruyama et al.

(10) Patent No.: US 12,593,141 B2
(45) Date of Patent: Mar. 31, 2026

(54) INFORMATION MANAGEMENT DEVICE, INFORMATION MANAGEMENT METHOD, AND STORAGE MEDIUM FOR MANAGING INFORMATION PROVIDED TO A MOBILE OBJECT AND DEVICE USED BY A USER IN LOCATION DIFFERENT FROM THE MOBILE OBJECT

(71) Applicant: HONDA MOTOR CO., LTD., Tokyo (JP)

(72) Inventors: Kenta Maruyama, Tokyo (JP); Junichiro Onaka, Tokyo (JP); Junya Obara, Tokyo (JP); Yusuke Ishida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 18/370,894

(22) Filed: Sep. 21, 2023

(65) Prior Publication Data

US 2024/0107184 A1     Mar. 28, 2024

(30) Foreign Application Priority Data

Sep. 22, 2022    (JP) ................................. 2022-151155

(51) Int. Cl.
*H04N 23/61*       (2023.01)
*G10L 21/034*      (2013.01)
(Continued)

(52) U.S. Cl.
CPC ........... *H04N 23/90* (2023.01); *G10L 21/034* (2013.01); *H04N 7/181* (2013.01); *H04N 23/61* (2023.01)

(58) Field of Classification Search
None
See application file for complete search history.

(56) References Cited

U.S. PATENT DOCUMENTS

| | | | | |
|---|---|---|---|---|
| 9,893,697 B1 * | 2/2018 | Churchwell | ........ | G10L 21/0316 |
| 2022/0057269 A1 * | 2/2022 | Parameswaran | ...... | G01J 5/0871 |

(Continued)

FOREIGN PATENT DOCUMENTS

| | | |
|---|---|---|
| JP | 2020-094958 | 6/2020 |
| JP | 2020-149261 | 9/2020 |

(Continued)

OTHER PUBLICATIONS

Japanese Office Action for Japanese Patent Application No. 2022-151155 mailed Sep. 9, 2025.

*Primary Examiner* — Edemio Navas, Jr.
(74) *Attorney, Agent, or Firm* — Amin, Turocy & Watson, LLP

(57) ABSTRACT

An information management device according to the embodiment is an information management device that manages information provided to a first device mounted on a mobile object that an occupant has boarded and a second device used by a user at a location different from the mobile object, and includes an acquirer configured to acquire information from the first device and the second device, and a provider configured to provide each of the first device and the second device with information on the basis of the information acquired, in which the acquirer acquires an indoor image and an outdoor image of the mobile object using the first device, and acquires operation information of the user using the second device, and the provider switches between the indoor image and the outdoor image and provides the second device with a switching result when an operation of the user is a predetermined operation.

8 Claims, 14 Drawing Sheets

(51) Int. Cl.
    H04N 7/18 (2006.01)
    H04N 23/90 (2023.01)

(56) References Cited

U.S. PATENT DOCUMENTS

2022/0064909 A1   3/2022   Sasaki et al.
2022/0343765 A1*   10/2022   Kusayanagi ....... G01C 21/3679

FOREIGN PATENT DOCUMENTS

JP   2022-088141   6/2022
WO   WO-2022059332 A1 *   3/2022

* cited by examiner

FIG. 2

| OCCUPANT ID | COMMUNICATION IDENTIFICATION INFORMATION | USER ID OF TARGET USER | MOBILE OBJECT INFORMATION | PROVISION AVAILABILITY INFORMATION |
|---|---|---|---|---|
| 001 | ... | AAA, DDD, ... | ... | ... |
| 002 | ... | NO LIMITATION | ... | ... |
| ... | ... | ... | ... | ... |

360A

| USER ID | COMMUNICATION IDENTIFICATION INFORMATION | OCCUPANT ID OF TARGET OCCUPANT | USER INFORMATION |
|---|---|---|---|
| AAA | ... | 001, 005, ... | ... |
| BBB | ... | 006, 007, ... | ... |
| ... | ... | ... | ... |

360B

360

INFORMATION MANAGEMENT DEVICE, INFORMATION MANAGEMENT METHOD, AND STORAGE MEDIUM FOR MANAGING INFORMATION PROVIDED TO A MOBILE OBJECT AND DEVICE USED BY A USER IN LOCATION DIFFERENT FROM THE MOBILE OBJECT

CROSS-REFERENCE TO RELATED APPLICATION

Priority is claimed on Japanese Patent Application No. 2022-151155, filed Sep. 22, 2022, the content of which is incorporated herein by reference.

BACKGROUND

Field of the Invention

The present invention relates to an information management device, an information management method, and a storage medium.

Description of Related Art

Conventionally, research has been conducted on sharing images of scenery outside a vehicle and the like by performing communication between a device mounted on a mobile object such as a vehicle and a device used in a different location from the mobile object (For example, Japanese Unexamined Patent Application, First Publication No. 2020-94958).

SUMMARY

However, in the conventional technologies, there has been a problem that both an occupant of a mobile object and a user in a different location from the mobile object may not feel a sufficient sense of presence.

To solve the problem described above, an object of the present application is to provide an information management device, an information management method, and a storage medium that can enhance the sense of presence given to both an occupant of a mobile object and a user at a location different from the mobile object. It will also improve the visibility of the user and the safety of the occupant, and further improve the safety of traffic to contribute to the development of sustainable transportation systems.

The information management device, the information management method, and the storage medium according to the present invention have adopted the following configuration.

(1): An information management device according to one aspect of the present invention is an information management device that manages information provided to a first device mounted on a mobile object that an occupant has boarded and a second device used by a user at a location different from the mobile object, and includes an acquirer configured to acquire information from the first device and the second device, and a provider configured to provide each of the first device and the second device with information on the basis of the information acquired by the acquirer, in which the acquirer acquires an indoor image and an outdoor image of the mobile object using the first device, and acquires operation information of the user using the second device, and the provider switches between the indoor image and the outdoor image and provides the second device with a result of the switching when an operation of the user is a predetermined operation.

(2): In the aspect of (1) described above, the provider may set a reference position on the basis of a reference posture of the user, and switch from the indoor image to the outdoor image to provide a result of the switching when a movement distance from the set reference position is equal to or greater than a threshold value.

(3): In the aspect of (2) described above, the threshold value may be set according to a vehicle class of the mobile object.

(4): In the aspect of (1) described above, the acquirer may acquire indoor voice information of the mobile object from the first device, and the provider may change a volume of the indoor voice information when the outdoor image is provided.

(5): In the aspect of (1) described above, when the outdoor image is provided, the provider may increase a sound emitted from the outside of the mobile object included in the indoor voice information and/or decrease a sound emitted from the inside of the mobile object included in the indoor voice information.

(6): In the aspect of (1) described above, the acquirer may acquire information from an external sensor that recognizes an object near the mobile object, and the provider may provide the second device with information on a distance between the object detected by the external sensor and the mobile object when the outdoor image is provided.

(7) In the aspect of (6) described above, the provider may provide the second device with information indicating that a distance between the mobile object and the object is decreasing when the distance between the mobile object and the object is a predetermined distance or less.

(8): An information management method according to another aspect of the present invention includes, by a computer of an information management device that manages information provided to a first device mounted on a mobile object that an occupant has boarded and a second device used by a user at a location different from the mobile object, acquiring information from the first device and the second device, providing each of the first device and the second device with information on the basis of the acquired information, acquiring an indoor image and an outdoor image of the mobile object using the first device and acquiring operation information of the user using the second device, and switching between the indoor image and the outdoor image to provide the second device with a result of the switching when an operation of the user is a predetermined operation.

(9): A storage medium according to still another aspect of the present invention is a computer-readable non-transitory storage medium that has stored a program causing a computer of an information management device that manages information provided to a first device mounted on a mobile object that an occupant has boarded and a second device used by a user at a location different from the mobile object to execute acquiring information from the first device and the second device, providing each of the first device and the second device with information on the basis of the acquired information, acquiring an indoor image and an outdoor image of the mobile object using the first device and acquiring operation information of the user using the second device, and switching between the indoor image and the outdoor image to provide the second device with a result of the switching when an operation of the user is a predetermined operation.

According to the aspects of (1) to (9) described above, it is possible to enhance the sense of the presence of both the occupant of the mobile object and the user who is in a place different from the mobile object.

BRIEF DESCRIPTION OF THE DRAWINGS

FIG. 2 is a diagram which shows an example of content of user data.

DESCRIPTION OF EMBODIMENTS

An embodiment of an information management device, an information management method, and a storage medium of the present invention will be described below with reference to the drawings. In the following description, an information processing system to which the information management device is applied will be described. The information processing system includes, for example, a first device mounted on a mobile object which an occupant boards, a second device used by a user at a location different from the mobile object, and an information management device. A mobile object is, for example, a vehicle, but can be any mobile object (for example, a ship or a flying object) as long as it can be boarded by an occupant. The occupant is mainly a driver of the mobile object, but it can be an occupant other than the driver.

Between the first device and the second device, the voice collected by the microphone is transmitted to the other party and played back by a speaker to create a state as if a telephone call is made, and furthermore, mixed reality (MR) is provided to the second device side by displaying a part of an image captured by a camera unit of the first device using the second device. As a result, a user of the second device can get feeling of being aboard a mobile object in a simulated manner (simulated boarding experience) while being in a different place from the mobile object, and an occupant can get a feeling of actually boarding a mobile object with a user together by having a conversation with the user who has a pseudo experience of boarding the mobile object via the first device. In the following description, as described above, a simulated experience of a user as if the user were actually boarding a mobile object may be referred to as "simulated boarding." The first device and the second device do not need to be in a one-to-one relationship, and one of the plurality of first devices and one of the plurality of second devices are matched in a one-to-many relationship to operate as an information processing system. In the latter case, for example, one occupant can communicate with a plurality of users simultaneously or in sequence.

<Basic Configuration>

Figure 1:
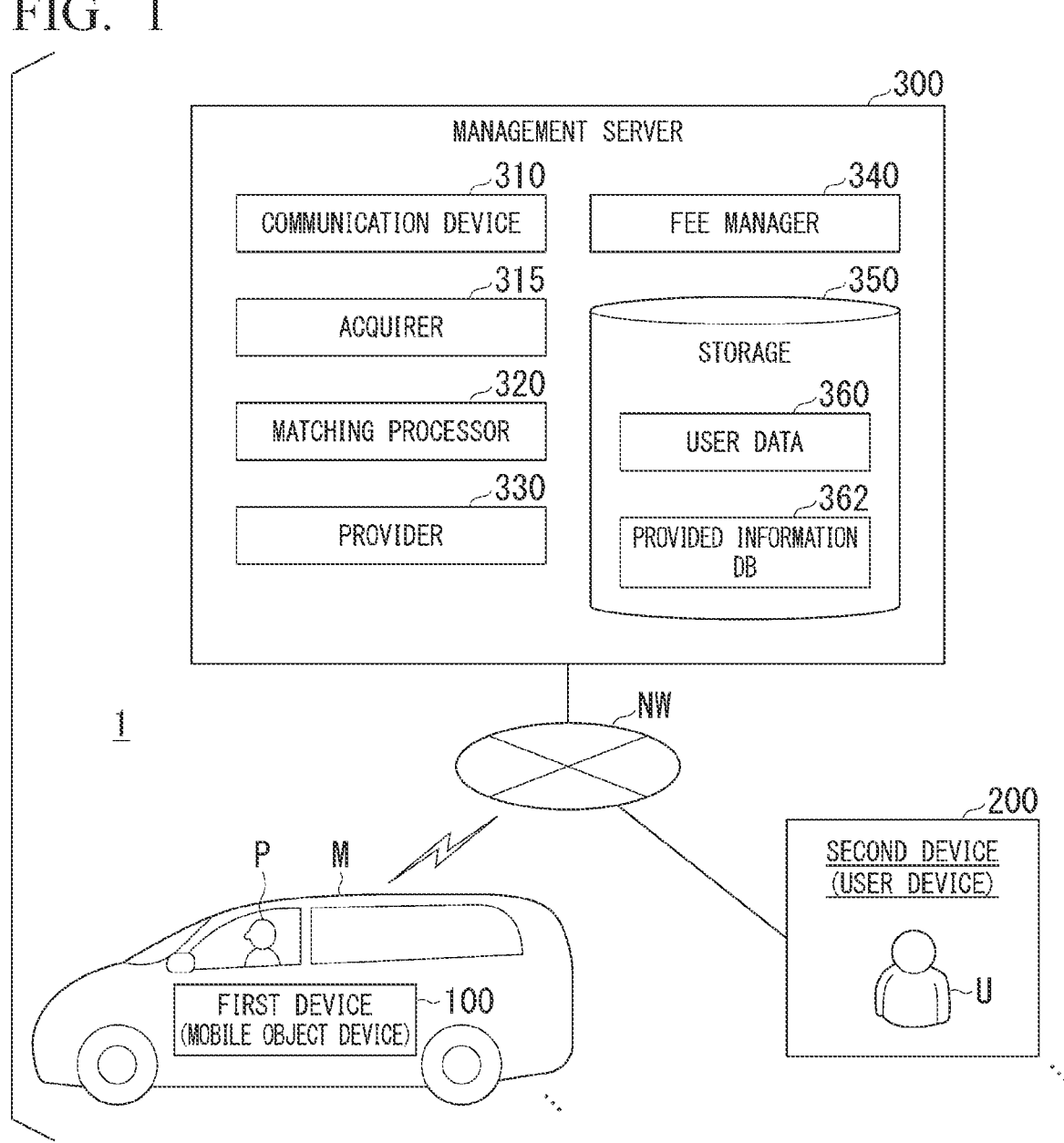
FIG. 1 is a diagram which shows a usage environment and the like of an information processing system and a management server.

FIG. 1 is a diagram which shows a usage environment and the like of an information processing system 1 and a management server 300. The information processing system 1 includes a first device (a mobile object device) 100 mounted on a mobile object M that the occupant P has boarded, and a second device (a user device) 200 used by a user U at a location different from the mobile object M (a location that happens to be close to the mobile object M is not excluded). Each of the first device 100, the second device 200, and the management server 300 communicate with each other via a network NW. The information processing system 1 may or may not include the management server 300. The network NW includes, for example, at least one of the Internet, a wide area network (WAN), a local area network (LAN), a mobile object communication network, a cellular network, and the like. The management server 300 is an example of the "information management device." The management server 300 may be realized in a server device or a storage device incorporated in a cloud computing system. In this case, functions of the management server 300 may be realized by a plurality of server devices and storage devices in the cloud computing system. The first device 100 mounted on the mobile object M may be realized by a plurality of units.

The management server 300 manages information provided to each of the first device 100 and the second device 200 and performs management for communication between them. The management server 300 includes, for example, a communication device 310, an acquirer 315, a matching processor 320, a provider 330, a fee manager 340, and a storage 350. The acquirer 315, the matching processor 320, the provider 330, and the fee manager 340 are realized by a hardware processor such as a central processing unit (CPU) executing a program (software). Some or all of these components may be realized by hardware (a circuit part; including circuitry) such as a large scale integration (LSI), an application specific integrated circuit (ASIC), a field-programmable gate array (FPGA), or a graphics processing unit (GPU), and may also be realized by software and hardware in cooperation. The program may be stored in advance in a storage device (a storage device with a non-transitory storage medium) such as a hard disk drive (HDD) or flash memory, or may be stored in a removable storage medium (a non-transitory storage medium) such as a DVD or CD-ROM, and installed by the storage medium being attached to a drive device. The program may be stored in the management server 300 and updated as appropriate by being connected to the network NW.

The communication device 310 is a communication interface for connecting to the network NW. Communication between the communication device 310 and the first device 100 and communication between the communication device 310 and the second device 200 are performed according to, for example, transmission control protocol/internet protocol (TCP/IP).

The acquirer 315 acquires various types of information transmitted by the first device 100, the second device 200, and the other external device via the network NW.

The matching processor 320 is realized by, for example, a processor such as a CPU executing a program (a command group) stored in a storage medium. For example, when the communication device 310 receives a matching request from the user U via the second device 200 or from the occupant P via the first device 100, the matching processor 320 refers to, for example, a user data 360 to perform matching between the matched user U and the occupant P, and uses the communication device 310 to transmit communication identification information of the first device 100 of the occupant P to the second device 200 of the matched user U and transmit communication identification information of the second device 200 of the user U to the first device 100 of the matched occupant P. Between the first device 100 and the second device 200 that have received these pieces of information, for example, it is possible to execute communication with higher real-time performance in accordance with a user datagram protocol (UDP).

The provider 330 generates information provided to each of the first device 100 and the second device 200 on the basis of various types of information acquired by the acquirer 315, and transmits the generated information to a target device. The provider 330 generates information indicating a result of processing performed by the matching processor 320 and fee information (fee settlement information) managed by the fee manager 340, and provides the generated information to the target device.

The fee manager 340 manages a fee charged to user U according to information provided to user U and a fee charged to the occupant P according to information provided to occupant P of the mobile object M. The fee manager 340 may also manage, for example, prices paid by the user U and the occupant P according to information provided by the user U and the occupant P. The fee manager 340 may also perform processing related to fee settlement of the user U and the occupant P.

The storage 350 may be realized by the various storage devices described above, or a solid state drive (SSD), an electrically erasable programmable read only memory (EE-PROM), a read only memory (ROM), a random access memory (RAM), or the like. The storage 350 store, for example, the user data 360, a provided information DB 362, a program, and other various types of information.

FIG. 2 is a diagram which shows an example of content of the user data 360. The user data 360 includes an occupant list 360A and a user list 360B. In the occupant list 360A, for example, an occupant ID that is identification information of the occupant P of the mobile object M, communication identification information thereof (an IP address, and the like), a user ID that is identification information of the user U to be matched, information of a mobile object which an occupant is boarding, and provision availability information that is set by the occupant are associated with each other. The information of the mobile object includes, for example, information of a device mounted on the mobile object M (information of a mounted device) and information of a vehicle class indicating a size and a shape of the mobile object M. The mobile object information may include information on a current position of the mobile object M, a destination, and surrounding conditions (for example, traveling on a coastal road), which are transmitted from the mobile object M at predetermined intervals. In the user list 360B, for example, a user ID, communication identification information thereof (an IP address, and the like), the occupant P to be matched, and user information are associated with each other. The user information may include information on a physique (for example, a height and a sitting height), information that can be used to predict the physique (for example, an age), and the like. Provision availability information is information that the mobile object M can provide or information that the mobile object M cannot provide, and is set by, for example, the occupant P. The provision availability information may be set for each mounted device of the mobile object M, or may be set for each user U. Examples of the provision availability information include, for example, "provision of an image is permitted," "provision of a voice is not permitted," "provision of an indoor image is permitted, but provision of an outdoor image is not permitted," and "provision of an occupant image is not permitted," "use of navigation devices is not permitted," and the like, but the present invention is not limited to these. The provision availability information may include a fee (a service provision fee) to enable a provision. The user data 360 may be generated in any manner instead of being limited to a mode shown in FIG. 2 as long as it includes these types of information.

Various types of information provided to the user U or the occupant P is stored in the provided information DB 362. Various types of information include, for example, map information, point of interest (POI) information, and images drawn by computer processing (for example, computer graphics (CG) images of people or images of marks, symbols, icons, and the like). POI information is, for example, information on various shops, theme parks, features, or the like for each point, and may be included in map information. Various types of information may include voice information. The provided information DB 362 may include advertisement information. The advertisement information may include, for example, an advertisement for the mobile object M, an advertisement for the user U or the occupant P, and an advertisement for a product or service of a store. The inserted advertisement information is managed separately from indoor and outdoor information, and the like, and when it is archived and distributed later, it may be different from the inserted advertisement information when distributed in real time (for example, a closed store will be changed to the latest store, an introduced menu will be the latest menu, and the like). Advertisement information is, for example, a video or voice.

Figure 3:
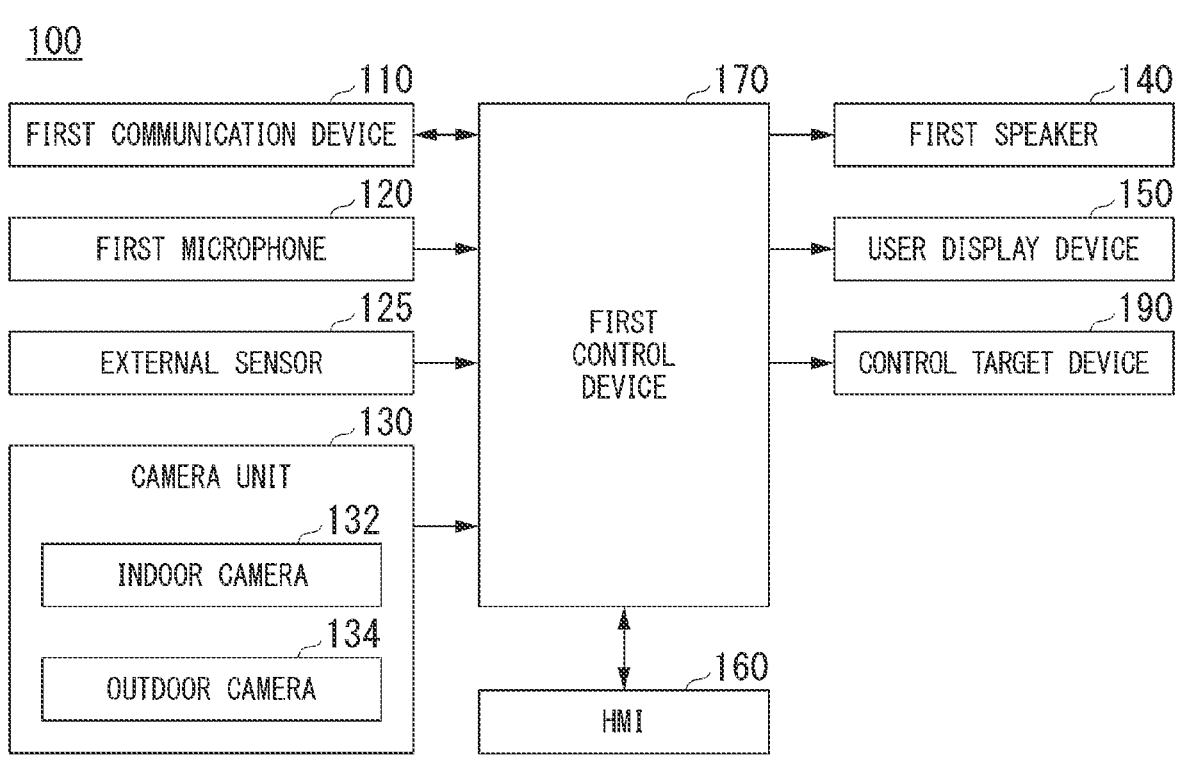
FIG. 3 is a configuration diagram of a first device.

FIG. 3 is a configuration diagram of the first device 100. The first device 100 includes, for example, a first communication device 110, a first microphone 120, an external sensor 125, a camera unit 130, a first speaker 140, a user display device 150, a human machine interface (HMI) 160, and a first control device 170. The first control device 170 is connected to the control target device 190 mounted on the mobile object M.

The first communication device 110 is a communication interface for communicating with each of the communication device 310 of the management server 300 and the second communication device 210 of the second device 200 which will be described below via the network NW.

The first microphone 120 collects at least a voice uttered by the occupant P. The first microphone 120 may be provided inside the mobile object M and have a sensitivity capable of collecting the voice outside the mobile object M, or may also include a microphone provided inside the mobile object M and a microphone provided outside the mobile object M. In the following description, voice information acquired by a microphone provided indoor may be referred to as "indoor voice information." The collected voice of the first microphone 120 is transmitted to the management server 300 or the second device 200 by the first communication device 110 via, for example, the first control device 170. When the microphone provided outside the mobile object M cannot be set, outdoor voice information may be pseudo-generated by processing the indoor voice information based on traveling information (a vehicle speed, an acceleration or deceleration, a road surface vibration, and the like) and the surrounding traveling environment. A positional relationship of a speaker with respect to the mobile object M (whether the speaker is inside the vehicle or outside the vehicle) can be recorded, and voices collected according to the positional relationship may be processed.

The external sensor 125 detects a position of an object around the mobile object M. The external sensor 125 includes, for example, a radar device, a light detection and ranging (LIDAR) sensor, and other various proximity sensors. The radar device emits radio waves such as millimeter waves to a periphery of the mobile object M and detects radio waves (reflected waves) reflected by the object to detect at least the position (a distance and a direction) of the object. The radar device may detect the position and a speed of an object by a frequency modulated continuous wave (FM-CW) method. The LIDAR sensor irradiates the periphery of the mobile object M with light (or electromagnetic waves with wavelengths close to that of light), measures the scattered light, and detects the distance to the object on the basis of a time from light emission to light reception. The irradiated light is, for example, pulsed laser light. The radar device and the LIDAR sensor are attached to any places of the mobile object M. The external sensor 125 may detect surrounding objects using a captured image of an outdoor camera 134 of the camera unit 130.

The camera unit 130 includes, for example, an indoor camera 132 and an outdoor camera 134. The first speaker 140 outputs a voice uttered by the user U, which is acquired via the first communication device 110. Details such as an arrangement of the camera unit 130 and the first speaker 140 will be described below with reference to FIG. 4.

The user display device 150 virtually displays the user U as if the user U is present inside the mobile object M. For example, the user display device 150 causes a hologram to appear, or displays the user U in a portion corresponding to a mirror or window of the mobile object M.

The HMI 160 is a touch panel, voice answering device (an agent device), or the like. The HMI 160 receives various instructions of the occupant P with respect to the first device 100, and provides various types of information to the occupant P.

The first control device 170 includes, for example, a processor such as a CPU, and a storage medium that is connected to the processor and stores a program (command group), and the processor executes a command group, thereby controlling each unit of the first device 100.

The control target device 190 is, for example, an in-vehicle device such as a navigation device that is mounted on the mobile object M and guides a route to a destination, or a driving assistance device that controls one or both of a steering and a speed of the mobile object M to assist with driving of the occupant P. The control target device 190 includes, for example, a seat driving device capable of adjusting a position (front, back, left, and right), an orientation, and a height of a seat. When an image is viewed by the second device 200 and the camera unit 130 of the first device 100 is attached to the seat, it is possible to suppress an influence on the image by prohibiting a movement of the seat. Even if the movement of the seat is permitted, processing such as conversion of an angle of view may be performed so as not to affect the image when the seat is moved. When the user U requests to see an image outside the angle of view of the current camera unit 130, a seat drive device may be controlled according to a request from the second device 200 side.

Figure 4:
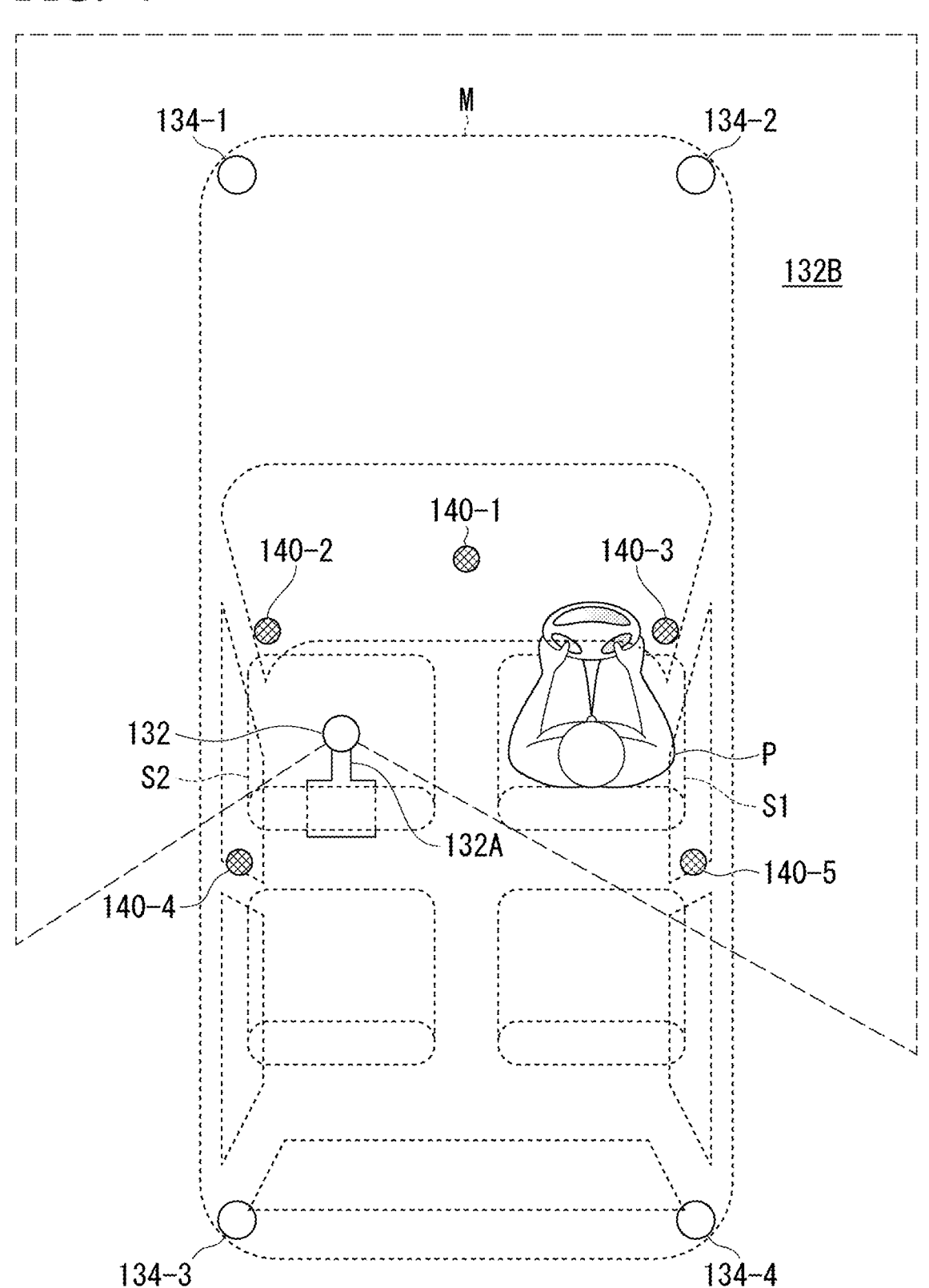
FIG. 4 is a diagram which shows an arrangement example of part of the first device in a mobile object.

FIG. 4 is a diagram which shows an arrangement example of part of the first device 100 in the mobile object M. The indoor camera 132 is attached to, for example, a neck pillow of an assistant driver's seat S2 (an example of the "predetermined seat") via an attachment 132A, and is provided at a position slightly separated from a backrest of the assistant driver's seat S2 in a traveling direction of the mobile object M. The indoor camera 132 has a wide-angle lens and is capable of capturing an image of a range represented by a hatched area 132B in FIG. 4. The indoor camera 132 can photograph not only an inside of the mobile object M but also an outside thereof through a window. In the following description, it is assumed that the assistant driver's seat S2 is the predetermined seat, but the predetermined seat may be another seat such as a rear seat.

The outdoor camera 134 includes, for example, a plurality of child outdoor cameras 134-1 to 134-4. By synthesizing images captured by the plurality of child outdoor cameras 134-1 to 134-4, an image such as a panoramic image obtained by capturing the outside of the mobile object M can be obtained. The outdoor camera 134 may include a wide-angle camera provided on a roof of the mobile object M instead of (or in addition to) these cameras. As the indoor camera 132, a camera capable of capturing an image of a rear of the assistant driver's seat S2 may be added, a mobile object image, which will be described below, may be combined with images captured by one or more indoor cameras 132 by the first control device 170 to be generated as a 360-degree panoramic image, or an image captured by the indoor camera 132 and an image captured by the outdoor camera 134 may be appropriately combined to be generated as the 360-degree panoramic image.

The first speaker 140 outputs a voice of the user U obtained via the first communication device 110. The first speaker 140 includes, for example, a plurality of first child speakers 140-1 to 140-5. For example, a first child speaker 140-1 is arranged at a center of an instrument panel, a first child speaker 140-2 is arranged at a left end of the instrument panel, a first child speaker 140-3 is arranged at a right end of the instrument panel, a first child speaker 140-4 is arranged at a bottom of a left door, and a first child speaker 140-5 is arranged at a bottom of a right door, respectively. When the first control device 170 causes the first speaker 140 to output the voice of the user U, it causes, for example, the first child speaker 140-2 and the first child speaker 140-4 to output the voice at the same volume, and localizes a sound image so that the voice from the assistant driver's seat S2 is audible to the occupant P seated in the driver's seat S1 by turning off the other first child speakers. A sound image localization method is not limited to adjusting a volume, but may be performed by shifting a phase of a sound output by each first child speaker. For example, when the sound image is localized so that a sound is audible from a left side, a timing for outputting the sound from a first child speaker on the left side needs to be slightly earlier than a timing for outputting the same sound from a first child speaker on a right side.

When the first control device 170 causes the first speaker 140 to output the voice of user U, it may localize a sound image so that the voice is audible from a height position corresponding to a height of a head of the user U on the assistant driver's seat S2 to the occupant P, and cause the first speaker 140 to output the voice uttered by the user U. In this case, the first speaker 140 needs to have the plurality of first child speakers 140-*k* (k is a plurality of natural numbers) with different heights.

Figure 5:
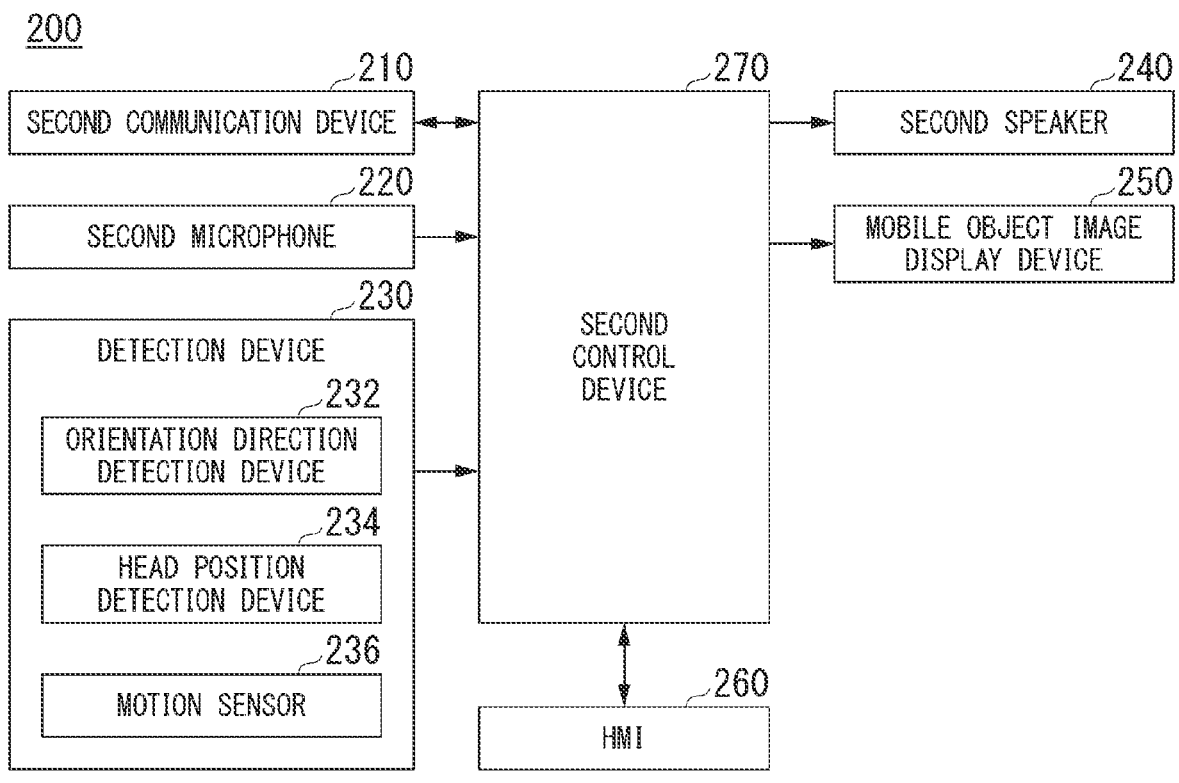
FIG. 5 is a configuration diagram of a second device.

FIG. 5 is a configuration diagram of the second device 200. The second device 200 includes, for example, a second communication device 210, a second microphone 220, a detection device 230, a second speaker 240, a mobile object image display device 250, an HMI 260, and a second control device 270. The detection device 230 includes, for example, an orientation direction detection device 232, a head position detection device 234, and a motion sensor 236.

The second communication device 210 is a communication interface for communicating with each of the communication device 310 of the management server 300 and the first communication device 110 of the first device 100 via the network NW.

The second microphone 220 collects the voice uttered by the user U. The collected voice of the second microphone 220 is transmitted to the first communication device 110 via, for example, the second control device 270 by the second communication device 210.

The orientation direction detection device 232 is a device for detecting an orientation direction. An orientation direction is an orientation based on an orientation of the face or a line-of-sight orientation of the user U or both of these. In the following description, it is assumed that an orientation direction is an angle in a horizontal plane, that is, an angle that does not have a vertical component, but the orientation direction may be an angle that also includes a vertical component. The orientation direction detection device 232 may include a physical sensor (for example, an acceleration sensor, a gyro sensor, or the like) attached to VR goggles, which will be described below, an infrared sensor for detecting a plurality of positions of the head of the user U, or a camera capturing an image of the head of the user U. In any of the cases, the second control device 270 calculates the orientation direction on the basis of information input from the orientation direction detection device 232. Since various technologies for this are known, detailed description thereof will be omitted.

The head position detection device 234 is a device for detecting a position (height) of the head of the user U. For example, one or more infrared sensors or optical sensors installed around a chair on which the user U is seated may be used as the head position detection device 234. In this case, the second control device 270 detects a position of the head of the user U on the basis of a presence or absence of a detection signal from one or more infrared sensors or optical sensors. The head position detection device 234 may be an acceleration sensor attached to the VR goggles. In this case, the second control device 270 detects the position of the head of the user U by integrating results of subtracting a gravitational acceleration from an output of the acceleration sensor. Information on the position of the head obtained in this manner is provided to the second control device 270 as height information. The position of the head of the user may be obtained on the basis of an operation of the user U with respect to the HMI 260. For example, the user U may enter his or her height numerically into the HMI 260 or may use a dial switch included in the HMI 260 to enter his or her height. In these cases, the position of the head, that is, height information, is calculated from the height. The user U may input discrete values such as the physique: large, medium, or small to the HMI 260 instead of continuous values. In this case, height information is acquired on the basis of information indicating the physique. A height of the head of the user U may be simply obtained on the basis of a general adult physique (which may be depending on a gender) instead of specially obtaining the height of the head of the user.

The motion sensor 236 is a device for recognizing a gesture operation performed by the user U. For example, a camera that captures an image of the upper body of the user U is used as the motion sensor 236. In this case, the second control device extracts feature points of the body of the user U (fingertips, wrists, elbows, or the like) from the image captured by the camera, and recognizes a gesture operation of the user U on the basis of motions of the feature points.

The second speaker 240 outputs the voice uttered by the occupant P acquired via the second communication device 210. The second speaker 240 has, for example, a function of changing a direction in which voice is heard. The second control device 270 causes the second speaker to output the voice so that the user U can hear the voice from a position of the occupant P as viewed from the assistant driver's seat S2. The second speaker 240 includes a plurality of second child speakers 240-*n* (n is a plurality of natural numbers), and the second control device 270 may perform sound image localization by adjusting a volume of each of the second child speakers 240-*n*, and may also perform sound image localization using a function of the headphones when headphones are attached to the VR goggles.

Figure 6:
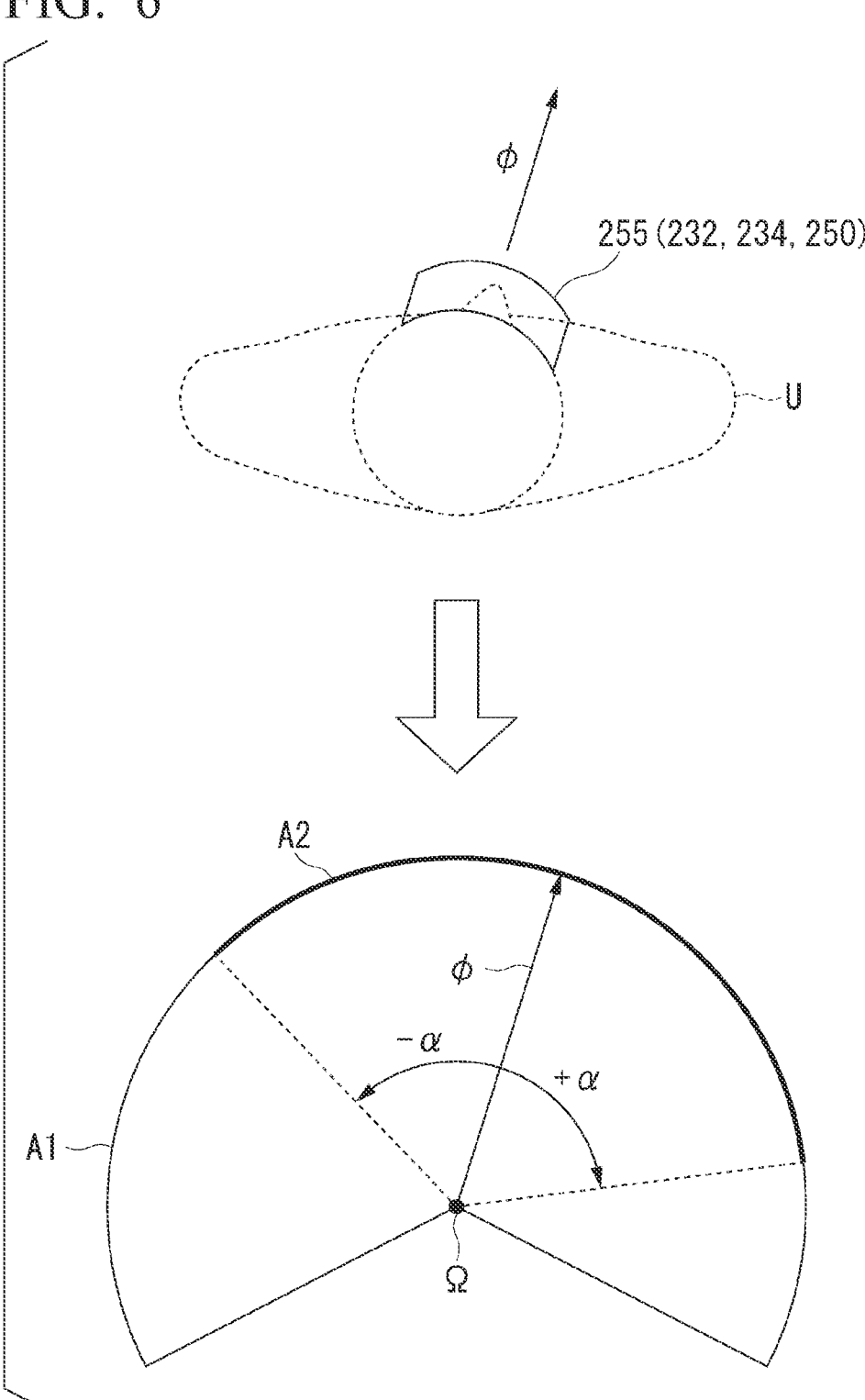
FIG. 6 is a diagram for describing an image corresponding to an orientation direction.

The mobile object image display device 250 displays an image which corresponds to the orientation direction as viewed from the assistant driver's seat among images captured by the camera unit 130 (which may be images that have undergone combining processing described above, and is hereinafter referred to as mobile object images). FIG. 6 is a diagram for describing an image corresponding to the orientation direction. In the example of FIG. 6, VR goggles 255 include the orientation direction detection device 232, a physical sensor as the head position detection device 234, and the mobile object image display device 250. The second control device 270 sets, for example, a center of the head of the user U or a center of the VR goggles 255 as $\Omega$, and detects a direction of the VR goggles 255 as an orientation direction $\varphi$ using a previously calibrated direction as a reference direction. Since various technologies for such functions are already known, detailed description thereof will be omitted.

The mobile object image display device 250 displays an image A2 in an angular range of plus or minus $\alpha$ centered on the orientation direction $\varphi$ toward the user U among the mobile object image A1 (which has an angle of about 240 degrees in FIG. 6, but an angle of view may be expanded by the combining processing as described above).

The HMI 260 is a touch panel, a voice answering device (an agent device), the switch or the like described above. The HMI 260 receives various instructions from the occupant P with respect to the second device 200.

The second control device 270 includes, for example, a processor such as a CPU, and a storage medium that is connected to the processor and stores a program (a command group), and controls each part of the second device 200 by a processor executing a command group. The second device 200 may have all the functions shown in FIG. 5 configured to be integrated into the VR goggles.

<Functional Configuration of First Control Device 170 and Second Control Device 270>

Hereinafter, a functional configuration of the first control device 170 and the second control device 270 will be described. In the first and second examples below, mainly the generation, transmission, and the like of information provided between the first control device 170 and the second control device 270 are performed, and the management server 300 manages matching of simulated boarding between the occupant P and the user U.

First Example

Figure 7:
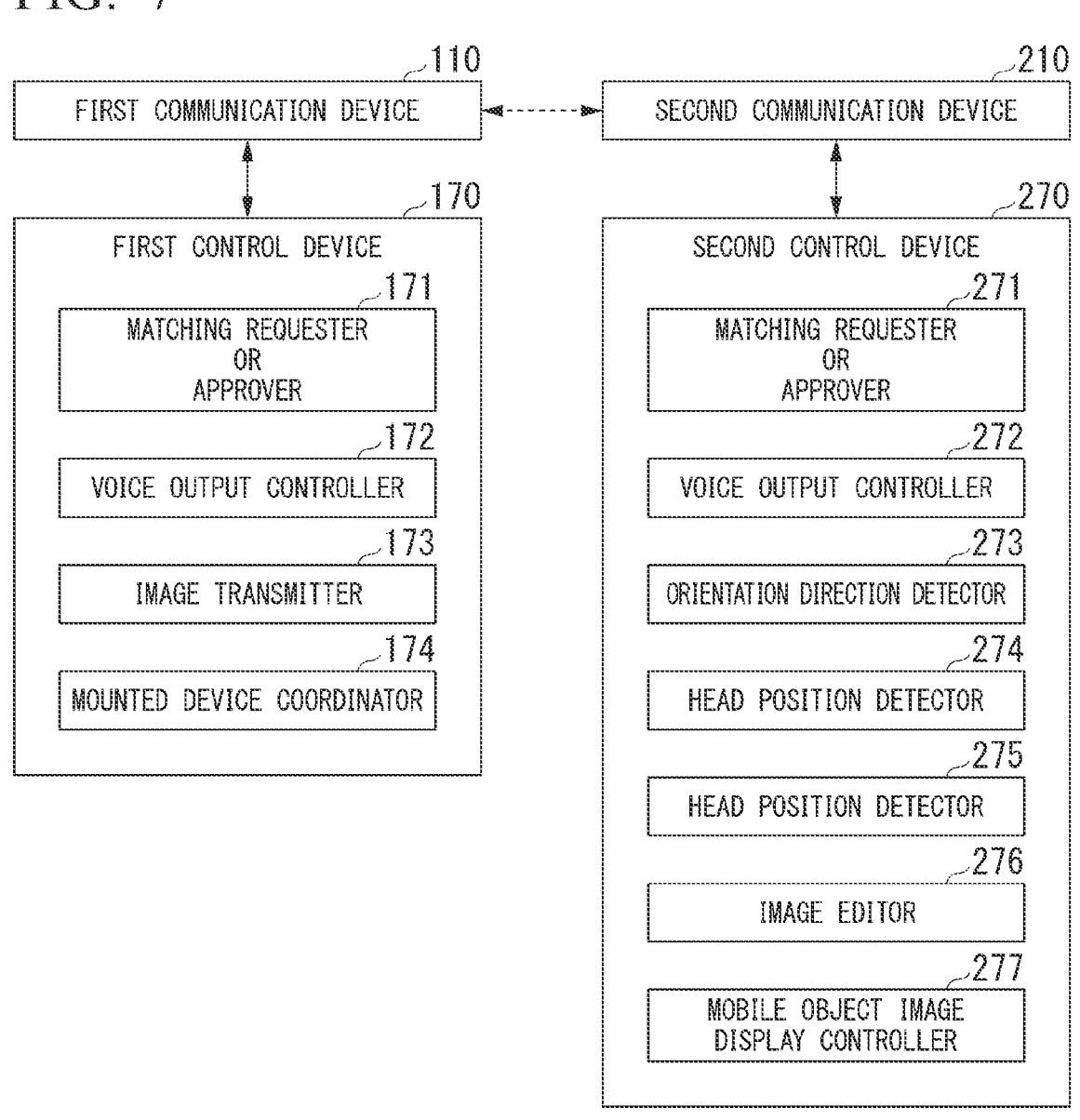
FIG. 7 is a diagram which shows a first example of functional configurations of a first control device and a second control device.

FIG. 7 is a diagram which shows a first example of the functional configuration of the first control device 170 and the second control device 270. In the first example, the first control device 170 includes a matching requester or approver 171, a voice output controller 172, an image transmitter 173, and a mounted device coordinator 174. The second control device 270 includes a matching requester or approver 271, a voice output controller 272, an orientation direction detector 273, a head position detector 274, a gesture input detector 275, an image editor 276, and a mobile object image display controller 277. These functional units are realized by a processor such as a CPU executing a program (a command group). Some or all of these components may be realized by hardware (circuit unit; including circuitry) such as LSI, an ASIC, an FPGA, and a GPU, or may also be realized by software and hardware in cooperation.

The matching requester or approver 171 uses the HMI 160 to receive an input of a matching request (a simulated boarding request) from an occupant P and transmit it to the management server 300 or uses the HMI 160 to receive an input of an approval for the matching request received from the management server 300 and transmit it to the management server 300. The matching requester or approver 171 controls the first communication device 110 so that the second device 200 of the user U whose matching has been established is set as a communication partner. The matching requester or approver 171 may receive, for example, setting of provision availability information indicating whether what type of information is permitted to be provided from the occupant P when a matching request obtained from the management server 300 is approved.

The voice output controller 172 controls the first speaker 140 as described above.

After communication with the second device 200 is started, the image transmitter 173 uses the first communication device 110 to transmit the mobile object image A1 to the second device 200. The mobile object image A1 may include, for example, an indoor image captured by the indoor camera 132 and/or an outdoor image captured by the outdoor camera 134.

The mounted device coordinator 174 controls the control target device 190 on the basis of an instruction signal input from the second device 200. The mounted device coordinator 174 may perform control when control of the control target device 190 by the user U is permitted by the occupant P.

The matching requester or approver 271 uses the HMI 260 to receive an input of a matching request (a simulated boarding request) from the user U, and transmit it to the management server 300, or receives an input of an approval for the matching request received from the management server 300 using the HMI 260, and transmits it to the management server 300. The matching requester or approver 271 controls the second communication device 210 so that the first device 100 of the occupant P for which matching has been established is a communication partner. The matching requester or approver 271 may present and confirm a kind of information to be provided to the user U based on, for example, a result of the matching (a request result) obtained from the management server 300, and may receive an instruction from the user U as to whether to perform simulated boarding.

The voice output controller 272 controls the second speaker 240 as described above.

The orientation direction detector 273 detects the orientation direction $\varphi$ on the basis of an output of the orientation direction detection device 232. The head position detector 274 detects the height of the head of the user U on the basis of an output of the head position detection device 234. The head position may be expressed as three-dimensional coordinates, or the height of the head may be simply detected as the head position. The gesture input detector 275 detects a gesture input of the user U on the basis of an output of the motion sensor 236.

The image editor 276 performs, for example, processing of cutting out an image A2 corresponding to the orientation direction $\varphi$ viewed from the assistant driver's seat S2 from the mobile object image A1 (FIG. 6). Although the orientation direction $\varphi$ with respect to a horizontal motion of the head of the user U is shown in the example of FIG. 6, processing of cutting out an image corresponding to the orientation direction with respect to a vertical motion of the head may also be performed. The mobile object image display controller 277 causes the mobile object image display device 250 to display the image A2 cut out by the image editor 276. At this time, the image editor 276 may cause the mobile object image display device 250 to display an image corresponding to the orientation direction $\varphi$ viewed from a height indicated by height information of the head of the user U. For example, the image editor 276 switches between an indoor image and an outdoor image according to a distance of the head of the user U from a reference position (for example, an amount of movement in an upward direction or an amount of movement in a lateral direction) and displays it.

Second Example

Figure 8:
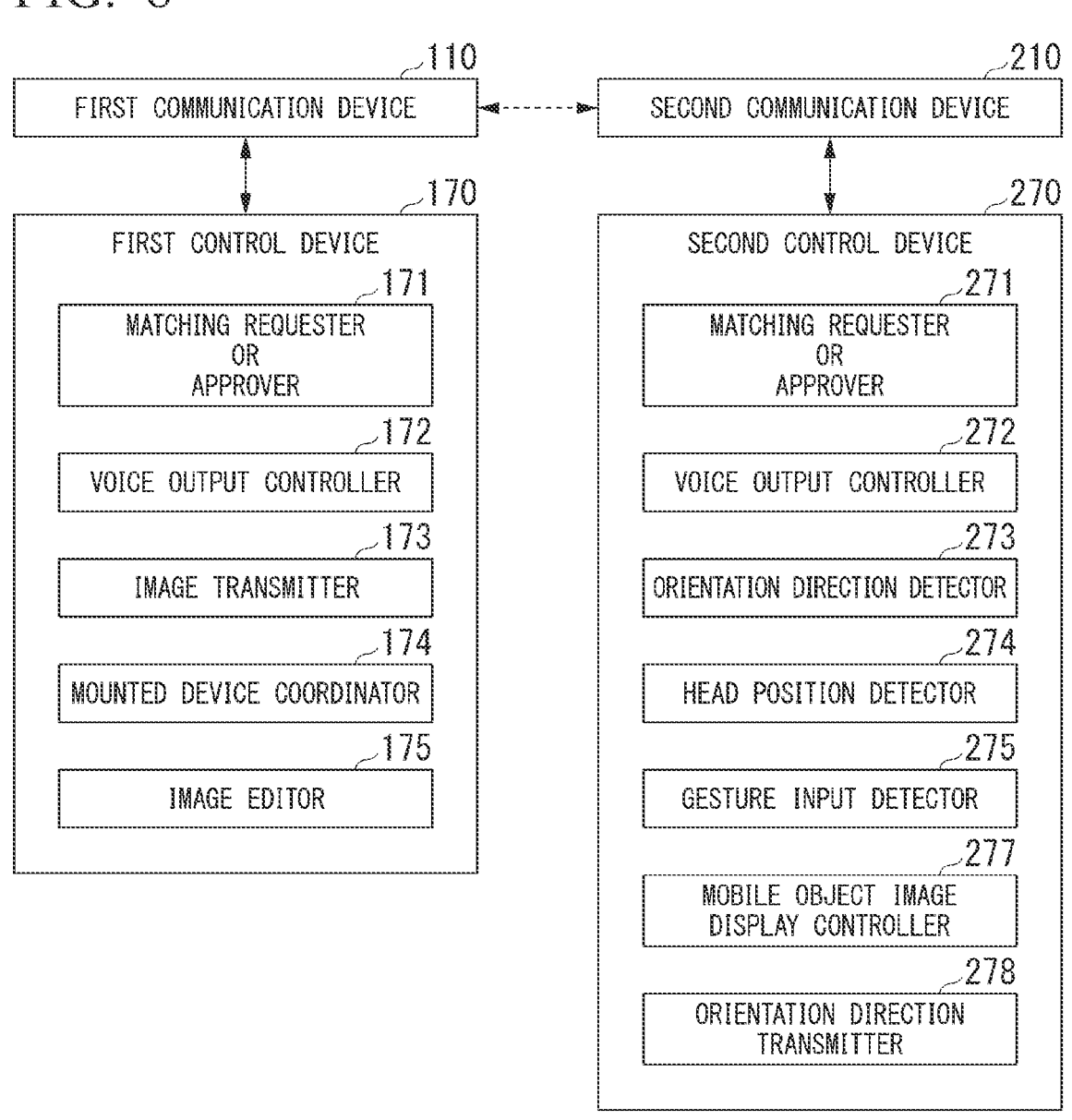
FIG. 8 is a diagram which shows a second example of the functional configurations of the first control device and the second control device.

FIG. 8 is a diagram which shows a second example of the functional configuration of the first control device 170 and the second control device 270. As compared to the first example of FIG. 7, the second example is different in that the first control device 170 includes an image editor 175 and the second control device 270 includes an orientation direction transmitter 278 instead of the image editor 276. Since the other components basically have the same functions as those of the first example, the description thereof will be omitted.

The orientation direction transmitter 278 transmits the orientation direction $\varphi$ detected by the orientation direction detector 273 to the first device 100 using the second communication device 210.

The image editor 175 performs the processing of cutting out the image A2 corresponding to the orientation direction $\varphi$ (transmitted from the second device 200) viewed from the assistant driver's seat from the mobile object image A1 (FIG. 6). At this time, the image editor 175 may acquire the height information of the head of the user U from the second device 200, and perform the processing of cutting out the image A2 corresponding to the orientation direction $\varphi$ viewed from the height indicated by the height information.

The image transmitter 173 in the second example uses the first communication device 110 to transmit the image A2 cut out by the image editor 175 to the second device 200. Then, the mobile object image display controller 277 causes the mobile object image display device 250 to display the image A2 transmitted from the first device 100.

<Processing for Simulated Boarding>

Figure 9:
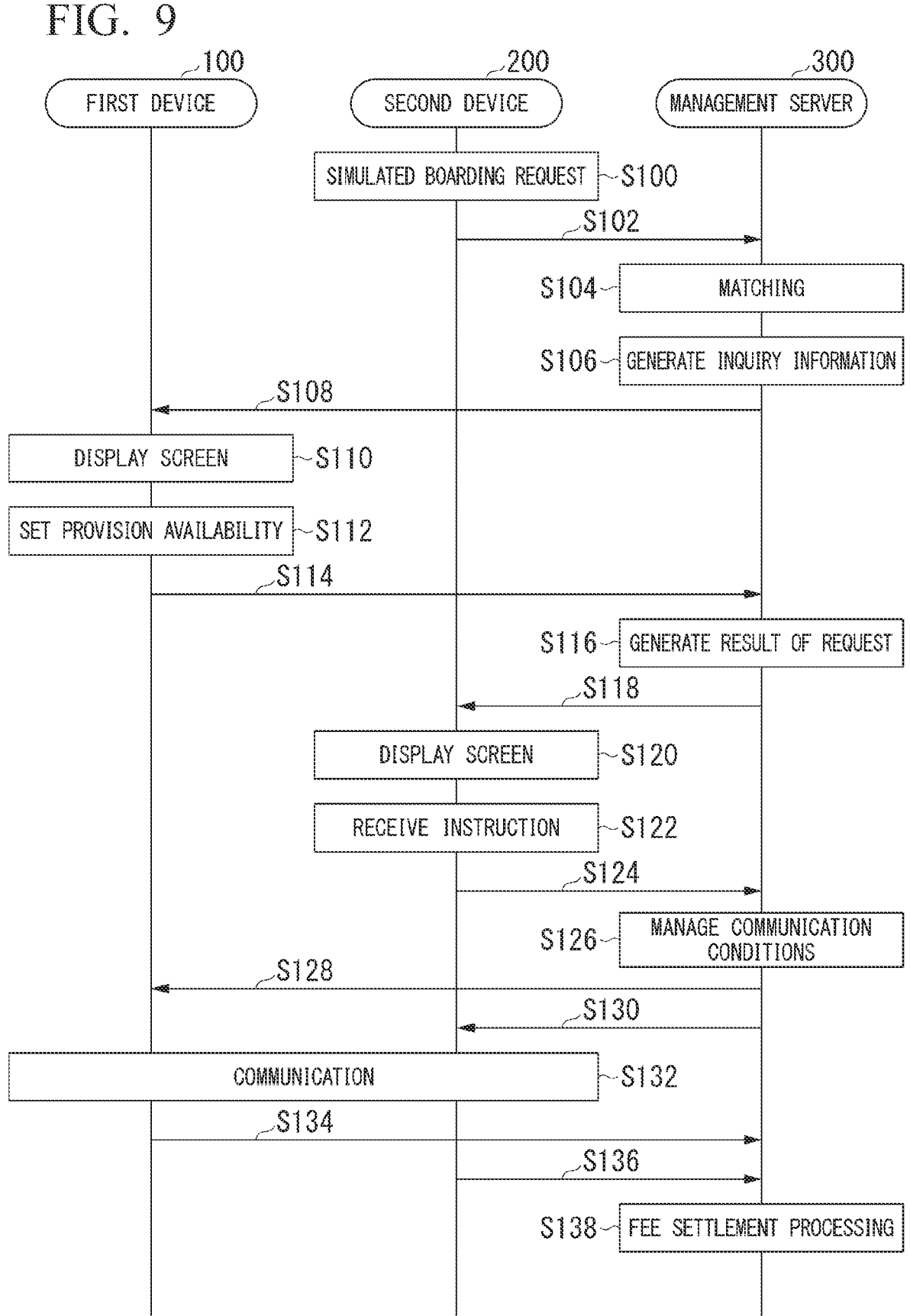
FIG. 9 is a sequence diagram which shows an example of processing executed by the information processing system.

Next, in the embodiment, a series of processing executed by the information processing system 1 when the user U performs simulated boarding on the mobile object M (the occupant P causes the user U to perform simulated boarding) will be specifically described. FIG. 9 is a sequence diagram which shows an example of processing executed by the information processing system 1. In the example of FIG. 9, processing in the first device 100 mounted on the mobile object M that the occupant P has boarded, the second device 200 used by the user U, and the management server 300 is shown. It is assumed that the user U and the occupant P are registered in the management server 300 in advance and registered in the user data 360 to receive services provided by the information processing system 1.

In the example of FIG. 9, the second device 200 generates a request for performing simulated boarding (a simulated boarding request) (step S100), and transmits the generated simulated boarding request to the management server 300 (step S102). The simulated boarding request may include, for example, information specifying the occupant P in advance, and may include information specifying the current position, destination, or surrounding conditions of the traveling mobile object M. More specific examples of the simulated boarding request include, for example, "I want to perform simulated boarding on a mobile object that Mr. A is driving" or "I want to perform simulated boarding on a mobile object that is traveling on a coastal road." These are examples of matching requests described above.

The matching processor 320 of the management server 300 receives a simulated experience request from the second device 200 and performs matching processing based on the user data 360 (step S104). Then, when there is one or more matching mobile objects M, the provider 330 generates inquiry information for inquiring whether simulated boarding is to be performed for all the mobile objects M (step S106), and transmits the generated information to the first device 100 of the matched mobile object M (step S108).

Figure 10:
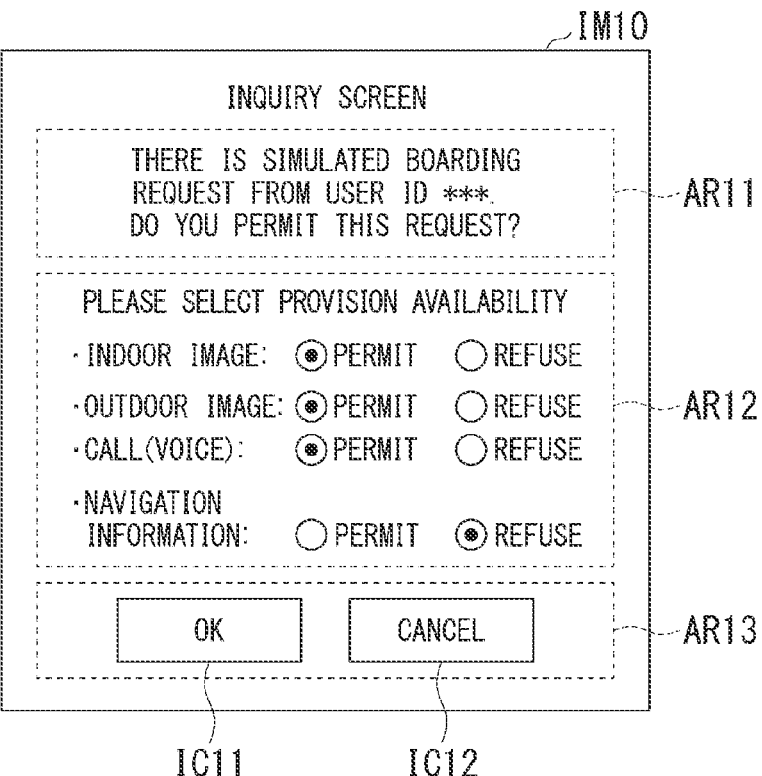
FIG. 10 is a diagram which shows an example of an image showing inquiry information.

The first device 100 displays the inquiry information transmitted from the management server 300 on a screen (step S110). FIG. 10 is a diagram which shows an example of an image IM10 indicating the inquiry information. Display modes such as display content and layouts included in the image IM10 are not limited to this. The same applies to descriptions of other images below. The image IM10 includes, for example, a user information display area AR11, a provision availability selection area AR12, and a switch display area AR13 as an inquiry screen. The user information display area AR11 displays information on the user U who has made a simulated boarding request. The information on the user U may be a user ID or other types of information by which the occupant P can identify the user U.

An image for selecting content of information provided to the user U by the occupant P for each piece of information is displayed in the provision availability selection area AR12. In an example of FIG. 10, a screen for selecting whether to permit information provision to the occupant P is displayed for an indoor image, an outdoor image, a call (voice), and navigation information (information provided from a navigation device). A call (voice) is an example of the "indoor voice information." For example, the occupant P may provide a call or an image to the user U, but when the occupant does not want the user U to specifically know a destination, he or she permits the provision of a call, an indoor image, or an outdoor image and refuses to provide navigation information. As a result, for example, when the user U is actually aboard the mobile object M, a destination can be easily known based on navigation information, but the user U can go to the destination without knowing it, and the user U can have a surprise experience peculiar to simulated boarding by not providing navigation information during simulated boarding. For example, by refusing to provide a call (voice) to a user U, who is not very close to the occupant, the occupant can drive without talking to the user. Information for selecting whether to perform the provision is not limited to the example of FIG. 10, and may include, for example, information for selecting a navigation operation or an operation to another control target device 190 by the user U, and information for selecting whether to provide an image containing the occupant P. Availability of provided information selected by the provision availability selection area AR12 may be changed during simulated boarding. The switch display area AR13 includes, for example, an icon IC11 and an icon IC12. The icon IC11 is a switch that receives permission for the user U's simulated boarding from the occupant P. On the other hand, the icon IC12 is a switch that receives refusal of the user U's simulated boarding from the occupant P.

Returning to FIG. 9, the first device 100 receives provision availability settings of the user U from the image IM10 or the like shown in FIG. 10 (step S112), and transmits the received provision availability setting information to the management server 300 (step S114). Processing of steps S110 to S112 may be displayed on the screen when the mobile object M has stopped to ensure safety while driving, and a simulated boarding request may be notified of using a voice instead of (or in addition to) the screen display or provision availability settings may be received. The provider 330 of the management server 300 generates a request result (response result) on the basis of the provision availability setting information obtained from the first device 100 (step S116), and transmits information indicating the generated request result to the second device 200 (step S118).

Figure 11:
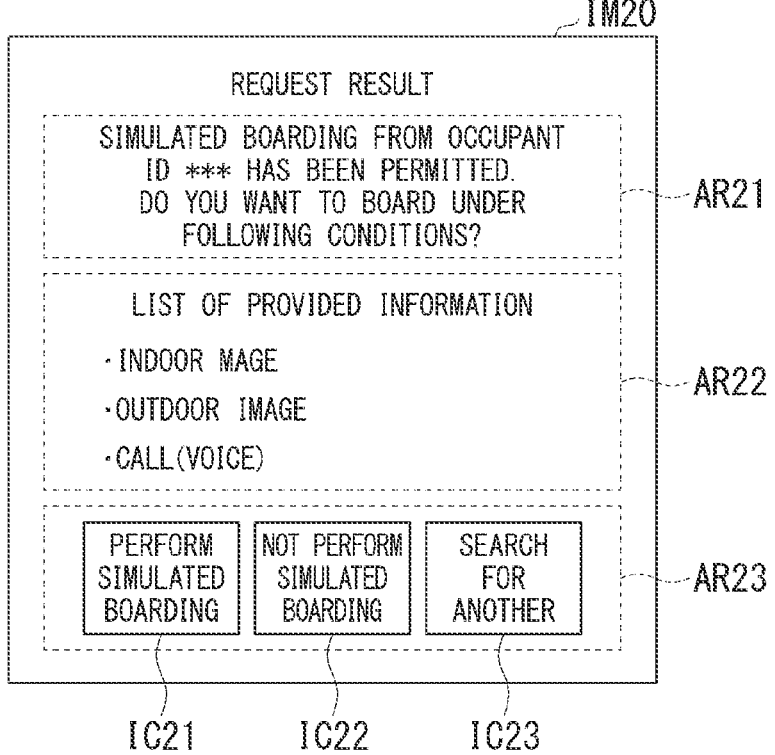
FIG. 11 is a diagram which shows an example of an image showing a request result.

The second device 200 receives the request result from the management server 300 and displays information indicating the received request result on the screen (step S120). FIG. 11 is a diagram which shows an example of an image IM20 showing the request result. The image IM20 includes, for example, an occupant information display area AR21, a provided information list display area AR22, and a switch display area AR23 as a request result screen. This image IM20 may be generated for each occupant P (mobile object M) for whom simulated boarding is permitted, and an image showing a list of request results may be further displayed.

The occupant information display area AR21 displays information on the occupant P who has permitted a simulated boarding request. Information on the occupant P may be an occupant ID or other types of information that allow the user U to identify the occupant P. Information permitted by the occupant P is displayed in a list in the provided information list display area AR22. A fee (a service usage fee) based on the permitted information may be displayed in the provided information list display area AR22. The switch display area AR23 includes, for example, icons IC21 to IC23. The icon IC21 is a switch that receives simulated boarding of the mobile object M by the occupant P displayed in the occupant information display area AR21 using the provided information displayed in the provided information list display area AR22. Conversely, the icon IC22 is a switch that receives non-simulated boarding. The icon IC23 is a switch that receives searching for another occupant (mobile object). When another occupant is searched for, they may be selected from other occupants included in the request result, or another request condition may be input to cause the management server 300 to perform the matching process again.

Returning to FIG. 9, the second device 200 receives a selection instruction from the user U using the image IM20 as shown in FIG. 11 described above (step S122), and transmits the received instruction information to the management server 300 (step S124). In the following description, it is assumed that the user U has instructed the occupant P to perform simulated boarding the mobile object M. On the basis of the instruction from the second device 200, the management server 300 manages communication conditions between the first device 100 and the second device (step S126), and transmits information indicating that simulated boarding is performed to the first device 100 and the second device 200 (steps S128 and S130). In the processing of steps S126 to S130, when the user U selects not to perform simulated boarding, the provider 330 of the management server 300 notifies the occupant P of it by transmitting information to that effect to the first device 100.

Next, the first device 100 and the second device 200 communicate with each other to execute simulated boarding (step S132), and transmits information indicating that the communication has ended to the management server 300 when the simulated boarding ends (steps S134 and S136). In processing of step S132, the second device 200 may notify the occupant P from the user U before information from the first device 100 is provided to the second device 200. As a result, the user U can permit communication at his or her own timing and start providing information such as calls and video distribution. Next, the fee manager 340 of the management server 300 performs fee settlement processing on a fee for a service usage of each of the first device 100 and the second device 200. Specifically, the fee manager 340 varies fees for information provision on the basis of at least one of the type of the occupant P, the user U, and the mobile object M that provide information, the type of information that can be provided to the user U, and the amount of information. For example, when the occupant P or the user U is a celebrity, the usage fee is set to be higher than a normal fee, or when the mobile object M is a new car or a rare car, the usage fee is set to be higher than the normal fee. The fee manager 340 performs fee settlement processing corresponding to the set fee. As a result, processing of this sequence ends. Processing of step S112 (provision availability setting processing) shown in FIG. 9 may be set by the occupant P in advance for each registered user U.

<Information Provided at Time of Simulated Boarding>

Next, information provided to the user U during simulated boarding will be described in several examples. The following example is information provided in the processing of step S132 shown in FIG. 9, and, for example, an output mode of the information provided to the second device 200 varies depending on an operation by the user U, the type of information that is available to the user, or the amount of information. In the following example, it is assumed that the occupant P is permitted to provide an indoor image, an outdoor image, and a call (voice).

<Example of First Provided Information: Indoor Image>

Figure 12:
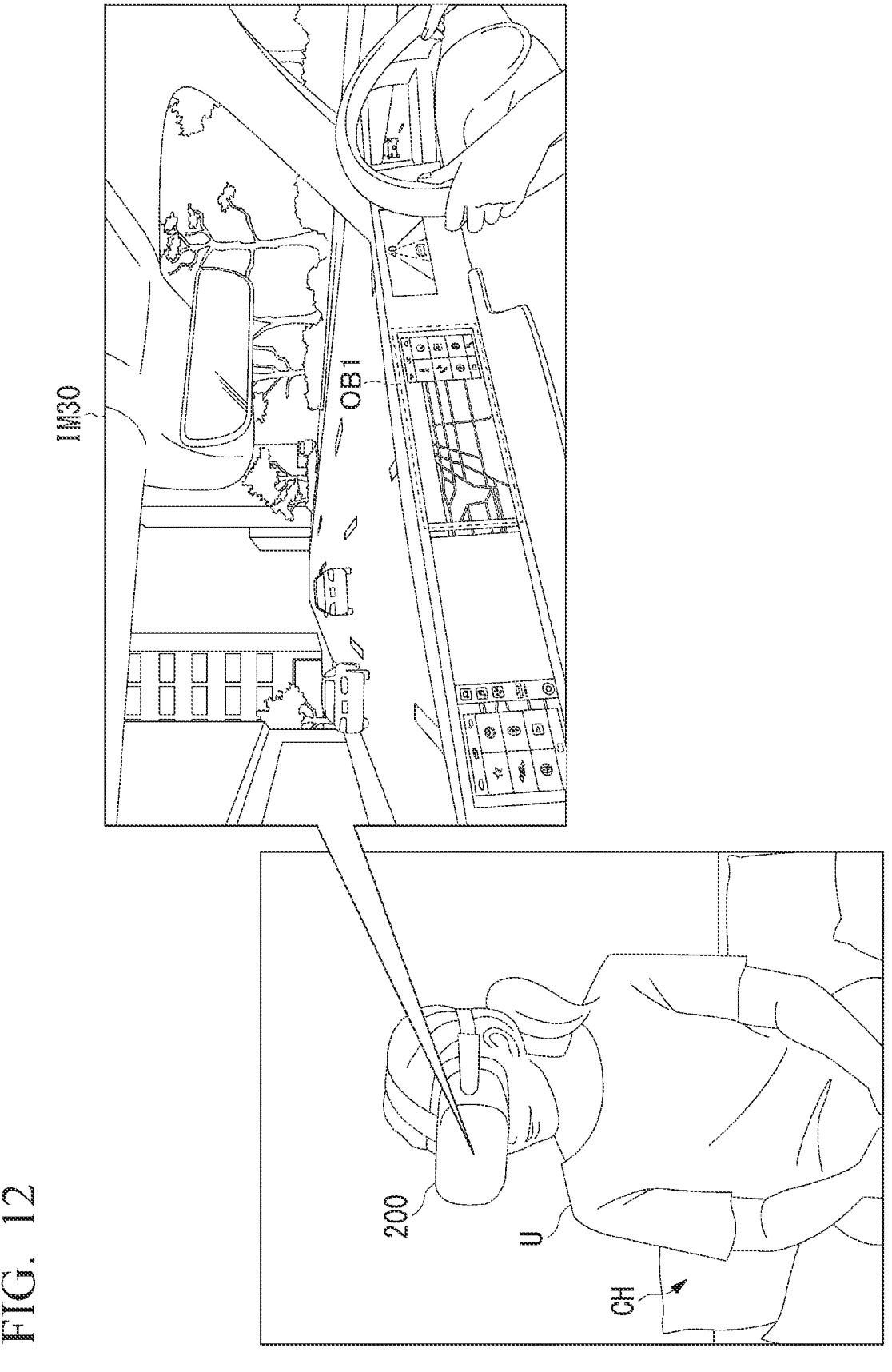
FIG. 12 is a diagram for describing an example of first provided information.

FIG. 12 is a diagram for describing an example of first provided information. In the example of FIG. 12, the user U to be seated on a chair CH in a place other than the mobile object M (for example, a room at home), and an example of an image IM30 provided from the second device 200 used by the user U (integrated VR goggles in the example of FIG. 12) are shown. A state of the user U (a state of being seated on the chair CH) shown in the example of FIG. 12 shows an initial state immediately after execution of simulated boarding, and the first device 100 and the second device 200 recognize the position of the user U at this time (a reference posture) as the reference position. The reference position is a position where it is assumed that the user U is seated on the assistant driver's seat S2. The first control device 170 drives a seat driving device on the basis of physique information such as height or sitting height information of the user U registered in the user information of the user data 360, and thereby the reference position may be corrected so that a height of the indoor camera 132 is adjusted to the height of the user U (so-called zero-point correction). The reference position may be corrected by a correction instruction from the user U looking at the image IM30. The reference position may include orientation information when the user U is seated on the chair CH and faces the front.

For example, when the user U (the second device 200) is seated on a chair CH and is facing an arbitrary direction from the reference position, an image photographed by the indoor camera 132 of the first device 100 according to the direction is provided as the indoor image IM30. As a result, the user U can acquire an indoor image in any direction viewed from the assistant driver's seat S2. The user U is provided with a voice of the occupant P acquired by the first microphone 120 and voice information of a sound inside and outside the mobile object M. By conversing with the occupant P using the image IM 30 and the voice information, the user U can enjoy conversation as if he or she were actually boarding the mobile object M.

In the information processing system 1, it was explained that the user U can visually recognize any direction viewed from the assistant driver's seat S2, but there may be a restriction provided in a direction that can be visually recognized by the user U according to an agreement at the time of, for example, matching or provision availability settings of the occupant P. For example, the occupant P may provide a scenery in the traveling direction of the mobile object M or a scenery on an opposite side of the driver's seat S1, but may request that he or she does not want to display his or her own image. This is a case assumed to meet needs that the occupant P and the user U want to confirm a drive feeling of the mobile object M or want to visually recognize a desired streetscape while they are not in relation of family members or friends. In this case, such a limit is set on the basis of a result of matching by the matching processor 320 of the management server 300 or the provider 330, and the first control device 170 or the second control device 270 masks the angular range that is not visually recognized or performs correction so that the orientation direction φ is not oriented in a restricted direction according to the settings. Since information regarding such restrictions relates to privacy of the occupant P, it may be set on the first device 100 side. Furthermore, information whose provision has been refused may be provided after an approval of the occupant P by the user U further paying an additional fee.

The mobile object image display device 250 may replace a portion of the images captured by the camera unit 130 in which a predetermined article inside the mobile object M is captured with an image (a CG image) drawn by computer processing and display it. An area OB1 shown in FIG. 12 is a display device that performs navigation display, and the like, and is an example of the "predetermined article." When an image of a display screen of a display device is displayed as it is, the image may be blurred or the visibility may be reduced due to reflection of light. For this reason, the mobile object image display device 250 may acquire data for configuring the display screen of the display device or image data drawn by computer processing in the mobile object M from the first device 100, and embed an image redrawn by computer processing from the data or the acquired image data in the image (an edited image) captured by the camera unit 130 to display it. In this case, a position of an article inside the mobile object M, which is the predetermined article, is shared in advance between the first device 100 and the second device 200, and the mobile object image display controller 277 determines whether the predetermined article is included in an image to be displayed on the mobile object image display device 250 on the basis of, for example, the orientation direction φ, and perform replacement of images as described above when it is determined to be included. The "predetermined article" may be the head or face of the occupant P. In that case, the CG image such as an avatar may be changed according to a display of the occupant P. At least a part of the image data (CG image) and the like described above may be provided from the provided information DB of the management server 300.

<Example of Second Provided Information: Outdoor Image (Overhead Image)>

Figure 13:
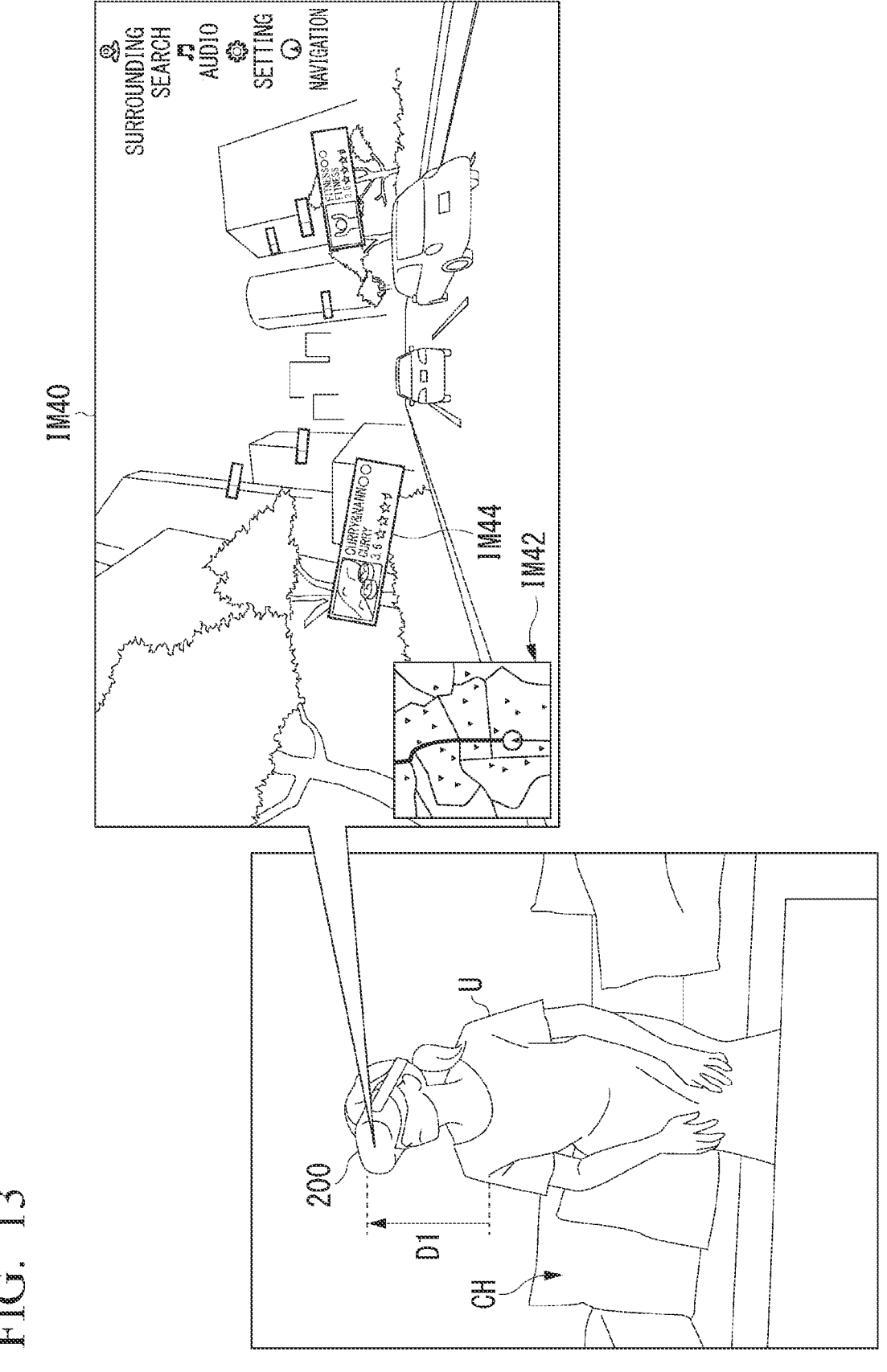
FIG. 13 is a diagram for describing an example of second provided information.

FIG. 13 is a diagram for describing an example of second provided information. The example of FIG. 13 shows an image IM40 provided when the height of the head of the user U (the second device 200) is increased by a distance D1 from the reference position. In this case, the first device 100 determines whether the moved distance D1 is equal to or greater than a threshold value, and when it is equal to or greater than the threshold value, an indoor image captured by the indoor camera 132 is switched to an outdoor image captured by the outdoor camera 134 and displayed. In the example of FIG. 13, since the distance D1 is equal to or greater than the threshold value, an outdoor image captured from an upper part of the mobile object M is displayed. As a result, the user U can obtain an experience peculiar to simulated boarding, which is impossible in an actual boarding, such as sticking out the head from a top of the mobile object M and looking at the surrounding scenery.

The threshold value may be a fixed value, or may be variably set according to a vehicle class of the mobile object M. For example, on the basis of the distance D1 and information on the vehicle class included in the mobile object information stored in the user data 360, when the first device 100 determines that the distance D1 from the reference position is equal to or greater than the vehicle class (an outer shape of the vehicle), a switch to the outdoor image is done. As a result, for example, when simulated boarding is performed on a large vehicle such as a bus, even if the user U stands up in the same manner (when the user has moved by the distance D1 shown in FIG. 13), the indoor image remains as it is. Therefore, since more realistic information is provided, it is possible to prevent the user U from feeling uncomfortable. The threshold value described above may be set in consideration of the physique of the user U.

When the user U stands up from the chair CH, the position of the head moves forward compared to when the user is seated due to a human body structure. However, since the user U thinks that he is just standing directly up, if the outdoor image is moved forward according to a forward movement of his head when he stands up, the user U may feel uncomfortable. Therefore, the first device 100 may perform correction processing so as not to move the outdoor image forward when the position of the head of the user U moves forward by a predetermined distance due to standing up.

In the example of the second provided information, an image IM42 indicating navigation information and an image IM44 indicating POI information (for example, shop information) corresponding to surrounding buildings may be displayed to be superimposed on the image IM40. This makes it possible to provide more detailed information.

When the indoor image is switched to the outdoor image, the first device 100 may perform correction to change a magnitude (a volume) of a sound provided to the second device 200 according to a type of the sound. For example, when the indoor image is switched to the outdoor image, the first device 100 adjusts each sound on the basis of feature information such as a sound frequency included in the indoor voice information acquired by the first microphone 120 installed indoors. For example, the first device 100 performs effect processing to increase a sound emitted from outside the vehicle (for example, noise) included in the indoor voice information, and/or to decrease a sound emitted from indoors included in the indoor voice information (for example, the voice of the occupant P or indoor music). As a result, the image IM40 and the voice can give the user U the feeling of actually sticking out the head from the vehicle. In a situation where the outdoor image is provided, when the user U is again seated on the chair CH (when the distance D1 from the reference position is less than the threshold value), the first device 100 switches to the indoor image, and performs voice effect processing to reverse the volume of a sound to that described above (or restore an original voice obtained by the first microphone 120) and provide it to the second device 200.

<Example of Third Provided Information: Outdoor Image (Side Image)>

Figure 14:
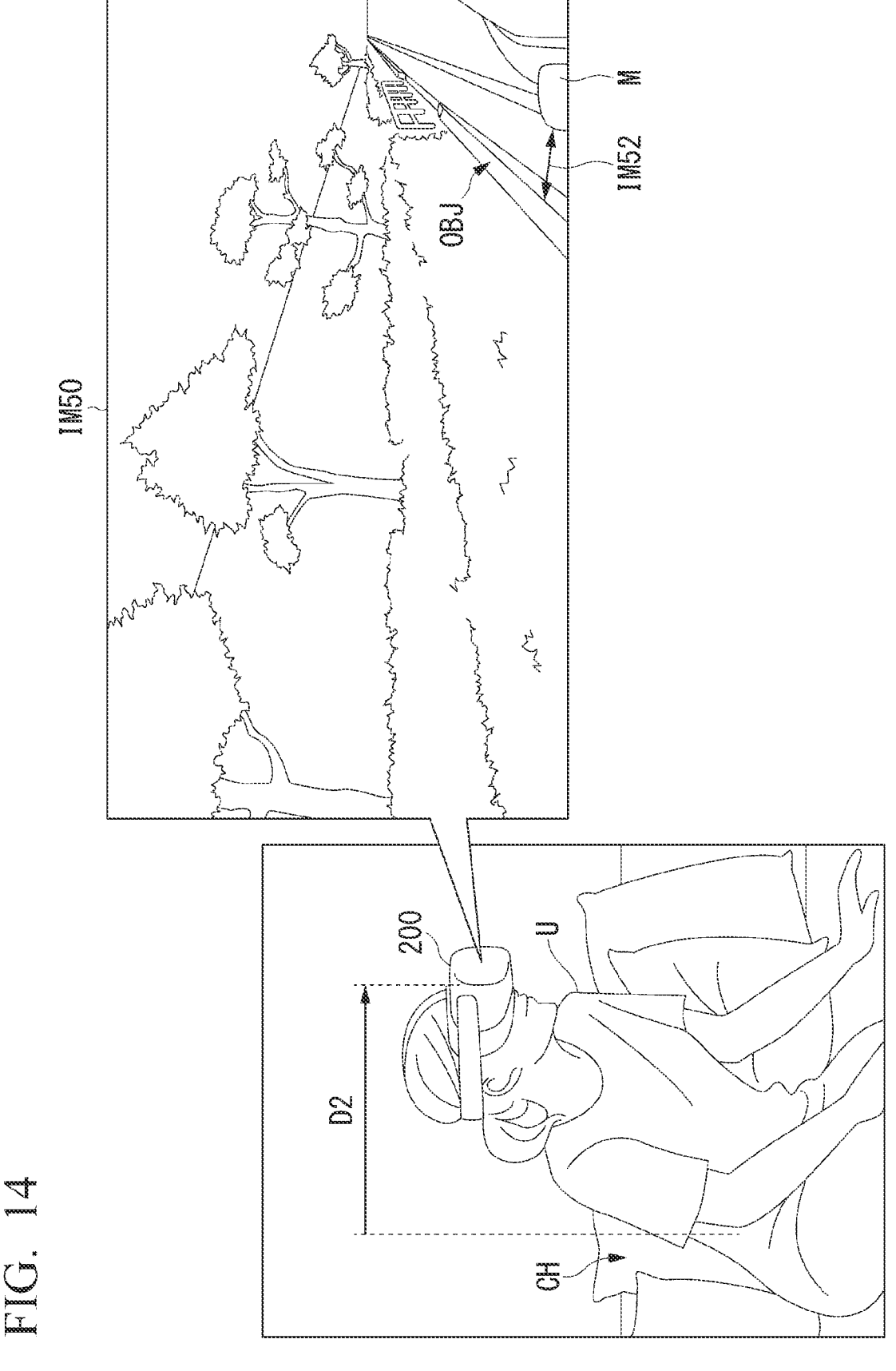
FIG. 14 is a diagram for describing an example of third provided information.

FIG. 14 is a diagram for describing an example of third provided information. FIG. 14 shows an example in which an outdoor image on a side of the mobile object M is provided instead of an overhead outdoor image, compared to the example in FIG. 13. Therefore, in FIG. 14, description will be made mainly focusing on difference points of FIG. 13.

The example of FIG. 14 shows an image IM50 provided when the position of the head of the user U (the second device 200) is laterally moved by a distance D2 from the reference position. In this case, the first device 100 determines whether the moved distance D2 is equal to or greater than the threshold value, and when it is equal to or greater than the threshold value, the indoor image captured by the indoor camera 132 is switched to the outdoor image captured by the outdoor camera 134 and displayed. In the example of FIG. 14, since the distance D2 is equal to or greater than the threshold value, an outdoor image captured from a side of the mobile object M in a direction of movement (more specifically, a front image due to the mobile object M facing slightly forward) is displayed. As a result, the user U can obtain an experience peculiar to simulated boarding, as if the user were looking at the surrounding scenery by sticking out the head from the side of the mobile object M (for example, a side window). The threshold value described above may be a fixed value, or may be variably set according to the information of a vehicle class of the mobile object M.

In a lateral movement of the user U, the position of the head may shift in the same manner as when the user stands up. Therefore, the first device 100 may perform correction so that there is no image shift when an amount of shift is a predetermined amount.

In the example of the third provided information, the image IM50 may display information indicating a distance from an obstacle OBJ such as curbstone detected by the external sensor 125 (for example, an image IM52 or a numerical value indicating the distance). In this case, the first device 100 acquires information from the external sensor 125 that recognizes objects around the mobile object M, and provides the second device 200 with the image IM52 indicating the distance between an object (the obstacle OBJ) detected by the external sensor 125 and the mobile object M when the outdoor image is provided. As a result, for example, the user U looks at the outdoor image IM50 near a shoulder of a road, which is a blind spot that the occupant P cannot see directly from the driver's seat, and notifies the occupant P of the content through conversation, and thereby it is possible to suppress contact with the obstacle OBJ and to perform more appropriate driving.

Instead of (or in addition to) the information indicating the distance, the first device 100 may provide the second device 200 with information (for example, alert information) indicating that the distance between the mobile object M and the object (obstacle OBJ) is decreasing when the distance between the mobile object M and the object (obstacle OBJ) is within a predetermined distance. As a result, it is possible to urge the user U to check the surroundings using an image outside the vehicle, and to cause the occupant P to ascertain a vicinity of the blind spot more accurately.

With the provided information described above, it is possible to provide an image and a voice of simulated boarding according to a predetermined operation of the user U. In the example described above, the image (the indoor image or the outdoor image) and the voice (with or without effect processing) are switched according to the movement of the user. However, according to mechanical switch (an operator) such as a switching button provided in the second device 200, the gesture operation of the user U, an operator provided in the first device 100, a gesture operation, or the like, the image and the voice may also be switched without depending on the operation of the user U.

The first to third provided images described above may be provided to the first device 100. As a result, the occupant P can more accurately ascertain what kind of image the user U is currently looking at, and can have a more appropriate conversation.

In the embodiment, the first device 100 may generate an image in which the user U is seated in the assistant driver's seat S2 (or a rear seat), and display the generated image on a rearview mirror display device or a window. In this case, the first control device 170 generates a person image in which the user U or a character corresponding to the user U is seated on the assistant driver's seat S2, and displays the generated image on the rearview mirror display device. In this case, a posture of the person image may be changed according to the operation of the user U obtained from the second device 200. The first control device 170 may control the first speaker 140 to output a voice from near the assistant driver's seat S2 when the person image is displayed on the rearview mirror display device 152. This voice is, for example, the voice uttered by the user U to the second microphone 220, transmitted by the second communication device 210, and acquired via the first communication device 110. The first control device 170 causes, for example, the first speaker 140 to output a voice whose sound image is localized so that the voice from the assistant driver's seat S2 is audible to the occupant P seated in the driver's seat.

Modified Example

In the information processing system 1 described above, at least some of the functions of the first device 100 and the second device 200 may be provided in the management server 300, and at least some of the functions of the management server 300 may be provided in the first device 100 or the second device 200.

Figure 15:
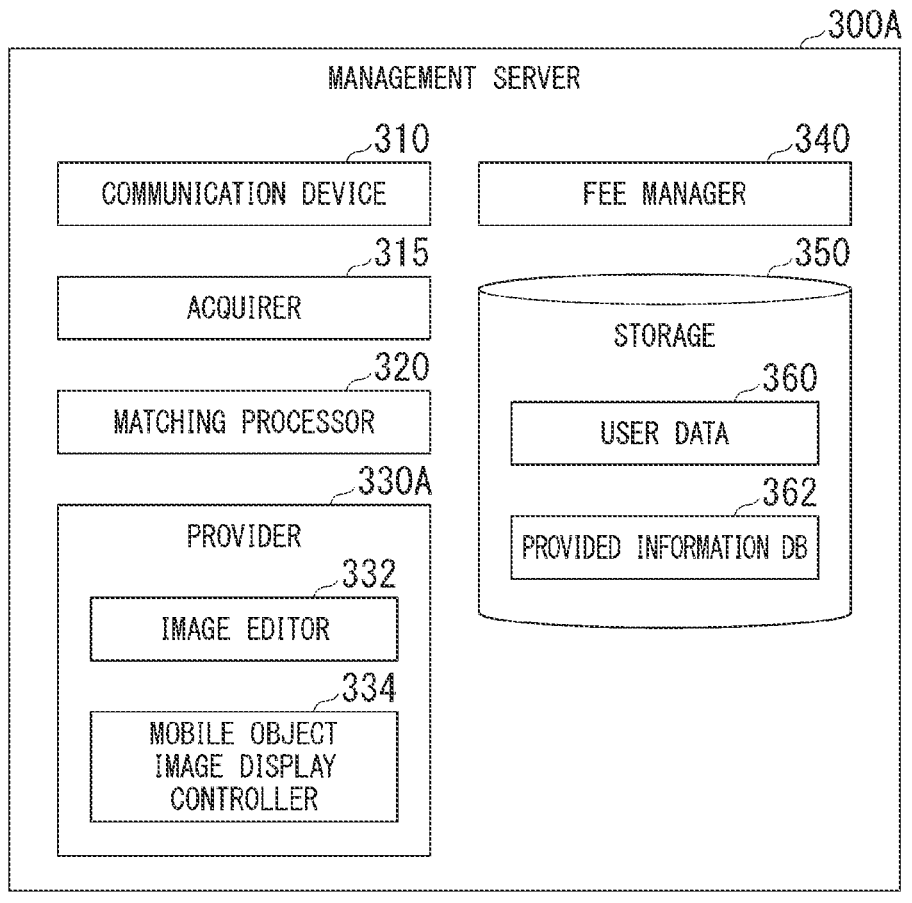
FIG. 15 is a diagram which shows an example of a functional configuration of a management server in a modified example.

For example, functions of the image editor 276 (or the image editor 175) and functions of the mobile object image display controller 277 described above may be provided on the management server side. FIG. 15 is a diagram which shows an example of a functional configuration of the management server 300A in a modified example. In the example of FIG. 15, the management server 300A includes, for example, a communication device 310, an acquirer 315, a matching processor 320, a provider 330A, a fee manager 340, and a storage 350. The management server 300A is provided with a provider 330A instead of the provider 330 as compared to the management server 300 shown in FIG. 1. Therefore, functions of the provider 330A will be mainly described below, and descriptions of other components will be omitted. In a case of the modified example shown in FIG. 15, for example, information acquired by the first device 100 and the second device 200 is acquired by the acquirer 315 of the management server 300A, and various types of information corresponding to each device are provided by the provider 330A.

For example, the provider 330A provides the second device 200 with information set to be available among the indoor image, the outdoor image, and the indoor voice information on the basis of the provision availability information set by the occupant P. For example, the provider 330A includes an image editor 332 and a mobile object image display controller 334, in addition to having the same functions as the provider 330. The image editor 332 performs similar processing to the image editor 276 (or the image editor 175) described above. For example, the image editor 332 acquires an image captured by the first device 100, and switches between the indoor image and the outdoor image depending on a presence or absence of a predetermined operation to provide the second device 200 with it on the basis of operation information (head position information) of the user U detected by the detection device 230 of the second device 200. In this case, the image editor 332 may generate an image in which another type of information (for example, navigation information or POI information) is superimposed on the indoor image or outdoor image.

The mobile object image display controller 334 provides the second device 200 with the image generated by the image editor 332, or controls switching of images or voices on the basis of the operation of the user U. For example, the mobile object image display controller 334 may acquire indoor voice information from the first device 100, perform the voice effect processing described above and the like in accordance with the switching of images, and provide a voice corresponding to the image provided to the second device 200.

When the provider 330A provides the second device 200 with an outdoor image, the provider 330A may provide information on the distance between the mobile object M and an object (for example, an obstacle) detected by the external sensor 125. When the distance between the mobile object M and the object is within a predetermined distance, the provider 330A may provide the second device 200 with information indicating that the distance between the mobile object M and the object is decreasing. When the user U makes a request to acquire information from the first device 100, the provider 330A provides information indicating that the request has been made to the occupant and acquires provision availability information set by the occupant P. The provider 330A may provide the second device 200 with information for allowing the user U to confirm information regarding the information provided by the first device 100. The provider 330A may vary an output mode of the information (images or voices) provided to the second device 200 according to the type of information or the amount of information that is available, which is set by the user U, or provide the second device 200 with advertisement information according to the types of information or the amount of information. The provider 330A may notify the occupant P from the user U before the information acquired from the first device 100 is provided to the second device 200.

According to the modified example described above, the provided image and voice can be centrally managed by the management server 300A. As a result, it is possible to more accurately ascertain a type of provided information, an amount of data, and a time of provision, and to appropriately manage service usage fees. Therefore, for example, the provider 330A provides the first device 100 or the second device 200 with advertisement information according to the type of information or the amount of information to be provided among the advertisement information registered in the provided information DB 362, and may cause the fee manager 340 to perform fee adjustment, such as reducing a fee for using a simulated boarding service or paying the price, according to the number of times the advertisement is viewed or a viewing time by the occupant P or the user U. The advertisement information may be information on the mobile object M, or information on the person when the occupant P or the user U is a celebrity.

By performing image editing, display control, and the like on the management server 300A side as shown in the modified example, a processing load on the first device 100 and the second device 200 can be reduced.

Summary

According to the information processing system 1 configured as described above, it is possible to enhance the sense of presence given to both the occupant P of the mobile object M and the user U who is in a different location from the mobile object M. According to the embodiment, it is possible to improve a visibility of a user and a safety of an occupant, to further improve a traffic safety, and to contribute to a development of a sustainable transportation system. In the embodiment, since an image corresponding to the orientation direction φ of the user U as viewed from the assistant driver's seat is displayed, the user U can visually recognize a scenery as if he or she were seated on the assistant driver's seat S2 and looking around. The first speaker 140 localizes a sound image so that a voice from the assistant driver's seat S2 is audible to the occupant P, and the occupant P can perform conversation with the user U as if the user U were in the assistant driver's seat S2 by outputting the voice uttered by the user U. Furthermore, the second speaker 240 localizes a sound image so that a voice from the position of the occupant P as viewed from the assistant driver's seat S2 is audible to the user U, and the user U can have a conversation with the occupant P as if he or she were in the assistant driver's seat S2 by outputting the voice uttered by the occupant P. The user U can control information that can be provided by simulated boarding. Therefore, an experience level and an experience mode of the simulated boarding by the occupant P can be controlled using settings of the user U.

Usage Example

The information processing system 1 can be used in the following modes.

(A) A mode in which the occupant P and the user U are in a relationship of family members, friends, or the like, and a virtual drive is provided to the user U. The user U can have a conversation with the occupant P regarding a scenery around the mobile object M while looking at an image.

(B) A mode in which the occupant P is a general user and the user U is a provider of a route guidance service, a driving guidance service, and the like. The user U can give a route guidance at a location that is difficult to understand with the navigation device or that is not on the map while looking at the surrounding scenery of the mobile object M, and can give a guidance on driving operations.

(C) A mode in which the occupant P is a celebrity, the user U is a general user, and user U is provided with a commercial-based virtual drive. In this case, a plurality of users U are associated with one occupant P at the same time, and, for example, a transfer of a voice from the user U side may be turned off. The user U may be able to talk on a phone with the occupant P for a predetermined time by paying an additional fee.

As described above, a mode for implementing the present invention has been described using the embodiments, but the present invention is not limited to such embodiments at all, and various modifications and replacements can be added within a range not departing from the gist of the present invention.

What is claimed is:

1. An information management device that manages information provided to a first device mounted on a mobile object that an occupant has boarded and a second device used by a user at a location different from the mobile object, comprising:

a processor that executes instructions to:

acquire information from the first device and the second device; and provide each of the first device and the second device with information on the basis of the information, wherein the processor acquires an indoor image and an outdoor image of the mobile object using the first device, and acquires operation information of the user using the second device, and the processor switches between the indoor image and the outdoor image and provides the second device with a result of the switching when an operation of the user is a predetermined operation, wherein the processor sets a reference position on the basis of a reference posture of the user, and switches from the indoor image to the outdoor image to provide a result of the switching when a movement distance from the set reference position is equal to or greater than a threshold value.

2. The information management device according to claim 1, wherein the threshold value is set according to a vehicle class of the mobile object.

3. The information management device according to claim 1, wherein the processor acquires indoor voice information of the mobile object from the first device, and changes a volume of the indoor voice information when the outdoor image is provided.

4. The information management device according to claim 3, wherein, when the outdoor image is provided, the processor increases a sound emitted from the outside of the mobile object included in the indoor voice information and/or decreases a sound emitted from the inside of the mobile object included in the indoor voice information.

5. The information management device according to claim 1, wherein the processor acquires information from an external sensor that recognizes an object near the mobile object, and provides the second device with information on a distance between the object detected by the external sensor and the mobile object when the outdoor image is provided.

6. The information management device according to claim 5, wherein the processor provides the second device with information indicating that a distance between the mobile object and the object is decreasing when the distance between the mobile object and the object is a predetermined distance or less.

7. An information management method comprising:

by a computer of an information management device that manages information provided to a first device mounted on a mobile object that an occupant has boarded and a second device used by a user at a location different from the mobile object, acquiring information from the first device and the second device;

providing each of the first device and the second device with information on the basis of the acquired information;

acquiring an indoor image and an outdoor image of the mobile object using the first device and acquiring operation information of the user using the second device;

switching between the indoor image and the outdoor image to provide the second device with a result of the switching when an operation of the user is a predetermined operation; and setting a reference position on the basis of a reference posture of the user, and switching from the indoor image to the outdoor image to provide a result of the switching when a movement distance from the set reference position is equal to or greater than a threshold value.

8. A computer-readable non-transitory storage medium that has stored a program causing a computer of an information management device that manages information provided to a first device mounted on a mobile object that an occupant has boarded and a second device used by a user at a location different from the mobile object to execute:

acquiring information from the first device and the second device;

providing each of the first device and the second device with information on the basis of the acquired information;

acquiring an indoor image and an outdoor image of the mobile object using the first device and acquiring operation information of the user using the second device;

switching between the indoor image and the outdoor image to provide the second device with a result of the switching when an operation of the user is a predetermined operation; and setting a reference position on the basis of a reference posture of the user, and switching from the indoor image to the outdoor image to provide a result of the switching when a movement distance from the set reference position is equal to or greater than a threshold value.

* * * * *